United States Patent
Hauser et al.

(10) Patent No.: US 7,551,702 B2
(45) Date of Patent: Jun. 23, 2009

(54) METHOD AND CIRCUIT ARRANGEMENT FOR SYNCHRONIZING A FUNCTION UNIT WITH A PREDETERMINED CLOCK FREQUENCY

(75) Inventors: Clemens Hauser, Heilbronn (DE); Arno Soerensen, Heilbronn (DE)

(73) Assignee: ATMEL Germany GmbH, Heilbronn (DE)

( * ) Notice: Subject to any disclaimer, the term of this patent is extended or adjusted under 35 U.S.C. 154(b) by 467 days.

(21) Appl. No.: 11/055,961

(22) Filed: Feb. 10, 2005

(65) Prior Publication Data

US 2005/0175133 A1    Aug. 11, 2005

(30) Foreign Application Priority Data

Feb. 10, 2004 (DE) .................. 10 2004 006 398

(51) Int. Cl.
*H04L 7/00* (2006.01)

(52) U.S. Cl. .................... 375/354; 375/355; 340/825.2

(58) Field of Classification Search .................. 375/365, 375/116, 340, 133, 369, 326, 360, 368, 354, 375/355, 373, 362, 364, 371, 376; 455/502; 340/825.2

See application file for complete search history.

(56) References Cited

U.S. PATENT DOCUMENTS

| | | | | |
|---|---|---|---|---|
| 3,549,804 A | * | 12/1970 | Whitaker et al. ............ | 375/359 |
| 5,809,094 A | * | 9/1998 | Masumoto et al. .......... | 375/365 |
| 5,969,631 A | * | 10/1999 | Ammler et al. ........ | 340/825.21 |
| 6,249,558 B1 | * | 6/2001 | Fendt et al. ................. | 375/361 |
| 2002/0052707 A1 | | 5/2002 | Fuhrmann et al. | |
| 2004/0156462 A1 | | 8/2004 | Fuehrer et al. | |

FOREIGN PATENT DOCUMENTS

| | | |
|---|---|---|
| DE | 44 18 622 | 11/1995 |
| DE | 199 11 945 | 9/1999 |
| DE | 100 07 070 | 8/2001 |
| DE | 10007070 | * 8/2001 |
| DE | 102 08 650 | 9/2002 |
| DE | 10208650 | * 9/2002 |
| EP | 0 312 671 | 4/1989 |
| JP | 55-112058 | 8/1980 |
| JP | 55110258 A | * 8/1980 |
| WO | WO02/076031 | 9/2002 |

OTHER PUBLICATIONS

LIN Protocol Specification, Revision 1.1; Apr. 17, 2000; pp. 8, 13, 26 and 27; Motorola GmbH, Munich, Germany.

* cited by examiner

*Primary Examiner*—Temesghen Ghebretinsae
(74) *Attorney, Agent, or Firm*—W. F. Fasse; W. G. Fasse

(57) ABSTRACT

A receiver is synchronized with a first clock frequency or signal of a transmitter for the proper reception of transmitted and received signals, such as data carrying signals (DS). The first clock frequency is for example a carrier frequency. A local oscillator generates a second clock frequency or signal in the receiver. Cycles or impulses of the second clock signal are counted between predetermined flanks of the received signal (DS) to provide a count (N). Based on the second clock signal and the count (N) a first ratio (TV) is provided that represents a first ratio between the first clock frequency or signal and the second clock frequency or signal. The first ratio is compared with a predetermined or given second ratio (TV) to provide a comparing result. The predetermined second ratio is then updated in response to the comparing result to provide an updated ratio (TV'). The present circuit is constructed to perform these steps.

21 Claims, 3 Drawing Sheets

METHOD AND CIRCUIT ARRANGEMENT FOR SYNCHRONIZING A FUNCTION UNIT WITH A PREDETERMINED CLOCK FREQUENCY

PRIORITY CLAIM

This application is based on and claims the priority under 35 U.S.C. §119 of German Patent Application 10 2004 006 398.2, filed on Feb. 10, 2004, the entire disclosure of which is incorporated herein by reference.

FIELD OF THE INVENTION

A function unit such as a receiver circuit and/or a signal selection circuit or the like is synchronized with a clock frequency of a received signal, particularly a data information carrying signal. The invention also relates to a circuit arrangement for performing the present method. These function units or circuits are preferably part of an integrated circuit.

BACKGROUND INFORMATION

The transmission of serial data at a determined data transmission rate is quite common in a multitude of technical areas. For example, a data source such as a microcontroller, may transmit such serial data at a determined first clock signal or frequency through a unidirectional data connection. Such a data connection may, for example, be a single wire bus without any response capability. The transmitted data are received by a receiver such as an integrated circuit (IC) and are to be evaluated within the receiver. Customarily a transmitter as the source of the data signals and the receiver do not have a common synchronizing clock. Therefore, the receiver must itself synchronize to the transmitter for recovering the first clock signal that is contained within the serial data. Such clock signal retrieval is necessary in order to correctly interrogate the data in a bit-by-bit fashion.

Normally the signal rate of the first clock signal is represented by a fraction of a local oscillator frequency or local oscillator clock rate of the receiver, whereby the local oscillator clock rate is provided as a second clock rate or frequency. Ideally, the first and second clock frequencies should be the same, whereby synchronization is automatically assured. In practice the local oscillator clock rate is determined, as a rule, internally of the integrated circuit by a local (RC)-oscillator having a clock frequency that is known only within certain limits. With the beginning of a starting bit of a data signal a counter is started to count. The respective count is incremented with each clock period or cycle, that is, with each internal or local clock pulse. The counter is reset to zero and then begins to count again when a count is reached that corresponds to a division ratio between the first data clock signal of the received signal and the second local oscillator clock signal or first and second clock signal frequencies. This resetting corresponds, when a correct synchronization is achieved, exactly to the beginning of the next data bit. Exactly at the center of the division, that is in the center of the data bit, the bus level is interrogated and thus the respective bit read-out. A second counter terminates this operation when a certain number of bits has been read.

Conventionally, there is the basic problem that the reading operation fails due to an erroneous synchronization between transmitter and receiver. A failed read-out can have grave adverse effects. Particularly in connection with uni-directional transmission media, there is no response possibility. Therefore, the receiver cannot request a known synchronization signal for a renewed follow-up synchronization during the transmission. Furthermore, it is not possible to make a renewed request for a data information that has been erroneously recognized. An erroneous synchronization means in this context that the divider or rather the division ratio deviates from a correct value either upwardly or downwardly. As a result, the counter is not reset as required, namely at the end of a data bit. Rather, the counter is reset either somewhat too early or somewhat too late. Correspondingly, the interrogation of the bus level does not take place at the center of a bit. To make matters worse, the up or down shifts accumulate as the number of bits to be interrogated increases. When the last bit of a sequence of bits is still correctly interrogated, the system is tolerant relative to an erroneous synchronization. Otherwise, double interrogations may be necessary and/or individual bits may be skipped. Further, the second clock frequency of the receiver is known only within certain limits such as ±10% of a rated clock frequency. Such tolerances are necessary due to manufacturing conditions. As a result, it is not possible to set a fixed divider or division ratio to achieve a constant, correct synchronization of the transmitter and the receiver forming together a system.

In order to achieve a certain synchronization between a transmitter and a receiver it has been suggested in conventional data transmission systems such as the LIN-bus (Local Interconnect Network) to transmit a so-called synchronization field. This synchronization field is transmitted at uniform time spacings prior to each data transmission and subsequent to a synchronization pause having a predetermined minimal duration. Reference is made in this connection to "LIN Protocol Specification", Revision 1.1 2000. The suggested system has the particular disadvantage that only a limited data transmission rate is available for useful data due to the necessary transmission interruptions. Furthermore, a single transmission error during the synchronization field, leads to a faulty synchronization during the following data transmission.

Another disadvantage of the above system is seen in that the clock frequency of the receiver can change during the operation, for example due to temperature influences. Thus, there is the possibility that, even though a single synchronization was correct, a following evaluation may be erroneous, nevertheless.

OBJECTS OF THE INVENTION

In view of the foregoing it is the aim of the invention to achieve the following objects singly or in combination:
to provide a method and circuit arrangement for performing the method for avoiding the above outlined disadvantages of the prior art;
to prevent errors occurring at points of time from completely destroying a prior synchronization;
to provide a method and circuit arrangement that has a certain tolerance against errors in the synchronization;
to perform the synchronization during the data transmission so that the entire data rate is available for a useful signal transmission because sending of separate synchronization sequences or fields is avoided;
to make sure that occurring errors automatically compensate each other; and
to assure, even for single wire transmission busses, a certain synchronization that is not sensitive to transmission disturbances, such as spikes in the transmission signal, nor to temperature influences.

The invention further aims to avoid or overcome the disadvantages of the prior art, and to achieve additional advantages, as apparent from the present specification. The attainment of these objects is, however, not a required limitation of the claimed invention.

SUMMARY OF THE INVENTION

The above objects have been achieved in a method in which the following steps are performed. The cycles of a local oscillator signal having a second clock frequency generated by a local oscillator in the function unit such as a data receiver are counted between predetermined flanks of the received data carrying signal having a first clock frequency to provide a respective count or count value. Then the clock signal frequency of the internal oscillator is divided by the count to provide a ratio between the received first signal clock and the internal oscillator second clock signal. The so achieved ratio is then compared with a predetermined ratio or division ratio that is given for the function unit such as a data receiver. Then, the predetermined division ratio is adapted or updated in response to the comparing result to provide an updated ratio (TV') for use as the next predetermined ratio.

The above method is performed according to the invention by a circuit arrangement comprising the following features. A counter or counters are provided for determining a count of clocks or clock cycles of an internal oscillator of the function unit between predetermined flanks of the received signal. These predetermined flanks may be falling or rising flanks. Determination means are provided for determining a ratio between the received signal clock and the local oscillator clock. A comparator is provided for comparing the just mentioned ratio with a predetermined ratio of the respective function unit. An adapter then updates or adapts the predetermined division ratio depending on the result of the comparing to provide an updated ratio (TV') for use as the predetermined next ratio.

A circuit arrangement according to the invention is embodied to perform the inventive method, for operating a function unit adapted to receive a data pulse signal including data pulses at a first clock frequency. An embodiment of the circuit arrangement comprises a counter having a first input for receiving the data pulse signal and a second input, a memory for storing a first pulse count ratio, a local oscillator operatively connected to the second input for supplying to the second input of the counter a local oscillator signal having clock pulses at a second clock frequency, wherein the counter is adapted to count the clock pulses of the local oscillator signal between two predetermined flanks of the data pulses of the data pulse signal to provide an actual pulse count, a pulse count dividing circuit for dividing the actual pulse count by two to provide a second pulse count ratio, a comparator for comparing the first pulse count ratio with the second pulse count ratio to provide a comparison result, and an updating unit for updating a present value of the first pulse count ratio to an updated value in response to and dependent on the comparison result.

Thus, according to the invention the synchronization between for example a data transmitter and a data receiver is performed during any current data transmission, whereby the synchronization result, more specifically an ascertained pulse ratio is not used directly and absolutely, but rather is used only for adapting or updating the latest pulse ratio or count in accordance with the comparing. In this manner it is assured that a certain or accurate synchronization is achieved at the end of a data sequence and that manufacturing limitations or conditions and/or temperature depending tolerances or changes of the internal oscillator frequency are compensated. Another advantage of the invention is seen in that the entire data rate is available for the transmission of useful signals rather than for the transmission of a synchronizing field. Thus, according to the invention the transmission of separate synchronization frequencies or fields is avoided. Spikes in the transmitted signal are also compensated.

The adaptation or updating of the initially given pulse count (TV) simply referred to as given ratio or given pulse count is preferably performed in accordance with the following rules:

$TV'=TV+1$, for $N/2>TV$;

$TV'=TV-1$, for $N/2<TV$; and $TV'=TV$, for $N/2=TV$, wherein TV is the initially given pulse count that designates nominal full synchronization, wherein TV' is the adapted or updated ratio and N is the above mentioned count or count value prior to its division by two. The invention achieves a current or gradual adaptation or updating of the synchronization so that any individual transmission error cannot lead to a completely erroneous division ratio, thereby limiting the error to a value of about 1. Such a small error is compensated during the next correct transmission. Correspondingly, the adapting or updating components of the present circuit arrangement are constructed to operate in accordance with the above stated rules.

The above mentioned counting of the clocks or cycles of the internal oscillator signal is preferably performed between two falling flanks of the received signal. However, counting between two rising flanks is also possible. The counter or counters used according to the invention are correspondingly equipped to count the clocks or cycles of the internal oscillator between two rising or between two falling flanks. As a result, the synchronization is constantly or always performed during the data transmission at a point when the sequence "1010" occurs in the data. No separate synchronization signal is necessary for this purpose. When the count is alternatively performed between two rising flanks of the received signal, the data sequence would be "0101".

Generally speaking, the bit length is ascertained with the aid of two equal signal flanks or impulse flanks either rising or falling. In this manner errors compensate each other automatically where such errors could occur when the bit length of a low or high bit are measured out differently due to the analog nature of the measurement conditions. Sources for the above mentioned faults or errors may be as follows.

First, the comparator threshold does not lie exactly at the center of the analog signal level.

Second, the comparator may have a hysteresis characteristic, that is asymmetric.

Third, the rising and falling times of the analog bus signal differ from one another.

Fourth, the bus signal itself has different low bit and high bit lengths or durations.

Fifth, the comparator has different slew rates for a low/high or a high/low transition.

Sixth, the comparator has different time delay durations or characteristics, depending on external conditions.

According to a further embodiment of the method according to the invention, an adapted or updated division ratio is stored for subsequent use. The storing takes place when the second predetermined signal flank is reached and the respective count is reset, whereupon the adapted ratio is stored as that ratio which is to be determined. The circuit arrangement according to the invention comprises for this purpose memories for storing the adapted or updated ratio as a new predetermined ratio.

A particular preferred embodiment of the invention provides that no adaptation or updating of the ratio takes place when the count is outside of a certain validity range. In other words, when the count exceeds a determined maximum value or when it is smaller than a determined minimal value, no updating of the division ratio takes place. For this purpose the comparator and/or the adaptation unit of the present circuit is constructed to prevent such an adaptation in response to the respective count being outside of the predetermined certain validity range. This feature of the invention has the advantage that local transmission errors on the bus are not used for determining the ratio. Such transmission errors may, for example involve spikes or the like in the transmitted signal. Moreover, an overflow of the counter is prevented. Such prevention is advantageous because adverse consequences may follow in that a wrong count is interpreted after an overflow as being valid while it is not valid. An invalid count would endanger the entire synchronization when the data transmission is repeated.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
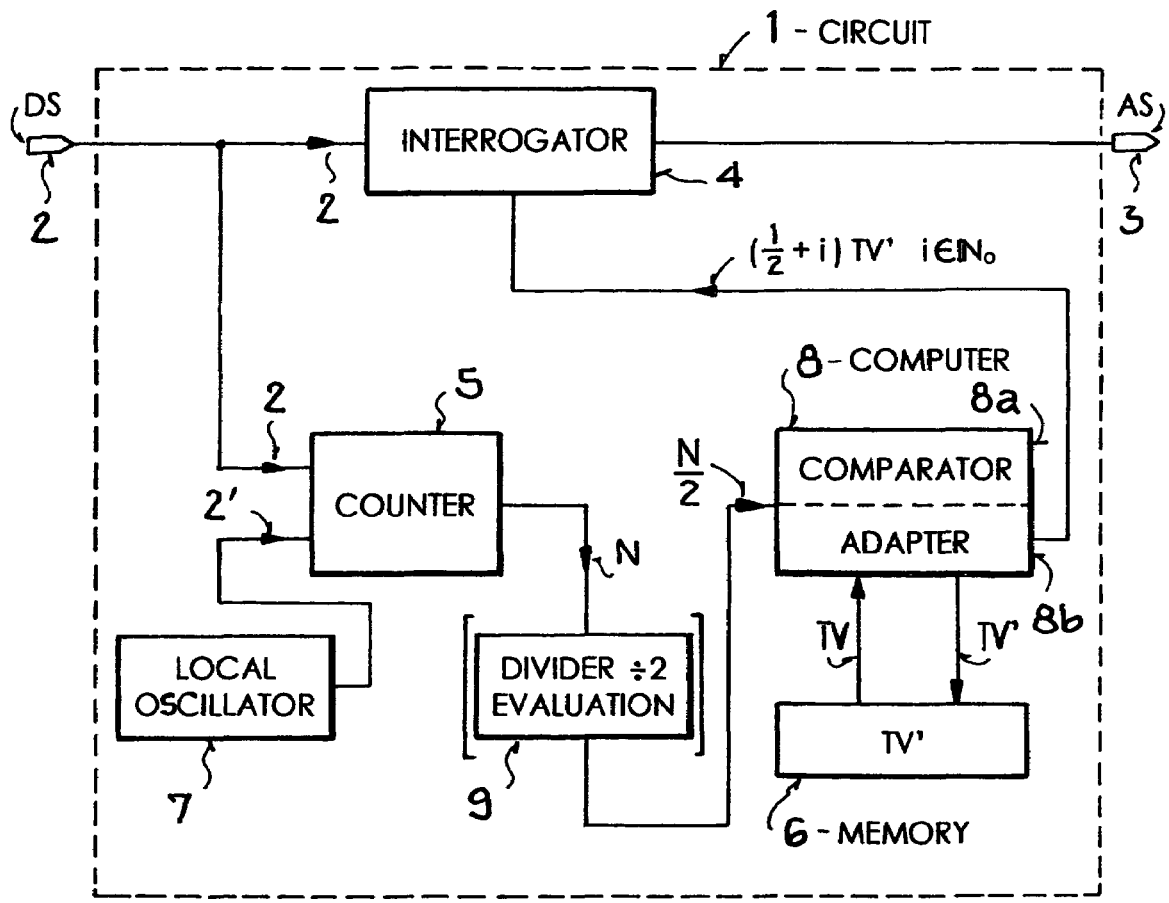
FIG. 1 illustrates a block circuit diagram of the circuit arrangement according to the invention.

FIG. 1 shows in the block diagram the basic construction of an apparatus or circuit arrangement 1 according to the invention. The circuit arrangement 1 has an input 2 to receive a serial data signal DS having a data clock DT constituting a first clock signal with a first clock signal frequency. The circuit has an output 3 for providing output signals AS based on interrogated data or data bits from the input signal DS. The data interrogation is performed by an interrogator or receiver circuit 4 connected between the input 2 and the output 3.

A counter 5, such as a down-counter, has a first input connected to the input 2 of the circuit arrangement 1 to receive the input signal DS. The counter 5 also has a second input 2' connected to a local or internal oscillator 7. An output of the counter 5 provides a pulse count N to a signal divider 9 for dividing the pulse count by two to provide N/2. The divider 9 is connected to an input of a comparator 8a of the computer 8. The divider 9 may either be a separate circuit component as shown in FIG. 1 or it may be part of the computer 8 as described below. A memory 6 is connected with an adapter or updating unit 8b of the computer 8. The memory 6 temporarily stores the counts or count values received from the divider and ratio values TV for influencing or controlling the interrogation unit 4. For this purpose an output of the adapter 8b of the computer 8 is connected to a control input of the interrogation unit 4. The counter 5 receives the clock pulses of the internal oscillator 7 which is, for example an RC-oscillator with a nominal or rated second clock frequency of 400 kHz (±10%). The present circuit arrangement can alternatively be equipped with an up counter for performing the present method.

The memory 6 is operatively connected to the adapter 8b of the computer 8 for adapting or updating the initially given pulse count TV as a function of the output signal N of the counter 5. A signal divider 9 may be optionally connected between the counter 5 and the computer 8. This signal divider 9 is constructed to divide the pulse count N by 2.

The box representing the signal divider 9 is shown in brackets in FIG. 1 to indicate that a separate divider is optional because this function can be performed by the computer 8. For this purpose the computer 8 is equipped to divide the pulse count N by 2.

The present circuit arrangement 1 shown in FIG. 1 functions as follows. In order to determine the given, initial pulse count or ratio TV between the local oscillator clock frequency IT and the data clock frequency DT, the number N of the clock pulses of the local oscillator 7 is counted between two falling flanks of the received data signal DS. More specifically, the counter 5 counts the local oscillator pulses between successive falling flanks of the signal sequence "1010". In this context "1" is the high level and "0" is the low level of the received data signal DS. On the other hand, ascertaining a clock count N between a falling signal flank and a rising signal flank indicated by a signal sequence "1001", could lead to errors in case a comparing threshold value is wrong in the interrogator circuit 4 connected to the data transmitting bus, not shown. As mentioned above, the evaluation is also possible by counting between two rising flanks ("0101") of the transmitted and received data signal DS. In the following text the performance of the present method is described with reference to counting the clock count or count value N between two falling signal flanks of the received data signal DS. However, it is to be understood, that the invention is not limited to this type of counting.

The counter 5 is started each time a falling flank of a received data signal DS occurs on the data bus connected to the input 2. The counter keeps counting following each local oscillator clock or impulse, more specifically following each past local oscillator clock or impulse ($DT^{-1}$) until the next following falling flank of the data signal DS stops the counter 5. Thus, the count N corresponds to the number of local oscillator clocks or clock cycles between two falling flanks of the data signal DS.

The count value N is then divided in the dividing circuit 9 by 2 and further processed in the computer 8. Dividing the count N by 2 already determines the actual ratio in principle between the local oscillator signal clock frequency IT and the data signal clock frequency DT. This is so because the time spacing between two falling signal flanks corresponds exactly to two data clock periods $DT^{-1}$. Thus, the dividing circuit 9 can be considered to function as a circuit that determines the division ratio between the local clock and the data clock, which represents a pulse count that corresponds to one half of the time between the two successive falling pulse flanks.

The data interrogation by the interrogator 4 takes place according to the invention when the count N corresponds to one half of the ratio or pulse count TV between the local oscillator signal clock frequency IT and the data signal clock frequency DT, (½+i) TV', i∈N. As a result, when the synchronization is correct, each data bit is read-out exactly at the time center of its level characteristic. More specifically, each bit is read-out of the bus correctly. According to the invention the initially given pulse count or division ratio TV is constantly or repeatedly adapted or updated because particularly the clock frequency IT of the internal oscillator 7 is not known with a sufficient accuracy due to manufacturing tolerances and due to its variability in response to temperature changes. The updated value of the division ratio TV is hereinafter denoted as TV'. As a result of such updating, the respective current or actual value is stored in the memory 6 and not used directly but it is used after updating to correctly determine the point of time when a data interrogation is performed. Using the respective ascertained count N directly without updating as a new ratio value could result in a situation where a single error such as a spike S due to a disturbance on the data bus, please see FIG. 2, could instantly lead to a complete loss of synchronization. The invention avoids this problem by comparing the actual pulse count N (divided by two) with the given or initial pulse count TV and then updating the current ratio or count incrementally in a step-by-step fashion, if necessary, in response to and dependent on the comparing.

The updating or adapting of the division ratio TV to TV' is performed by the computer 8 in the circuit 1. The computer 8 has a comparator 8a and an updating or adapter circuit 8b. The preferred rules for the adaptation or updating of the division ratio or initially given pulse count TV are set forth above and the updating is performed by the computer 8 preferably in accordance with a respective program stored in a memory of the computer 8. Thus, the memory contains the above mentioned rules. The resulting updated ratio TV' is yet to be stored in the memory 6 as the new ratio TV, which is used for subsequent synchronized interrogation (cf. FIG. 1). Directly following a reset of the circuit arrangement 1 there is not yet available a ratio or count TV from the data signal DS. A defined or certain default value is assumed for that case, namely following directly a resetting.

Thus, according to the invention a correct data interrogation is performed even if an erroneous adaptation or updating took place, for example due to a signal error on the data bus. This correct data interrogation is assured because the adaptation or updating of the ratio TV to TV' is small in its value from cycle to cycle. Namely: $\Delta TV=TV'-TV=0\pm 1$ (FIG. 1). Moreover, it is an advantage of the invention that already with the next valid synchronization maintaining step an updating or adapting error is corrected. As a rule, the correction takes place already with the next data bit. As a result, the method according to the invention has a high tolerance relative to disturbances on the data bus.

The ascertained count or count value N of local oscillator clock pulses between two falling signal flanks does not need, however, to correspond at all times to two data bits. Thus, respectively higher count values are obtained in case several bits with an equal value are counted over several clock pulses having a constant signal level. Alternatively, lower values are obtained in case of the above mentioned disturbances on the data bus. In order to exclude such count values that are too large or too small for the updating of the ratio or given pulse count TV right from the start, the invention sets a limit range or value range G for the count N in order to avoid falsifying the synchronization rather than maintaining it. This limit range is monitored by the computer 8. Thus, only if the count N is within the value range G (N∈G) an adaptation or updating of the ratio or initial pulse count TV is performed. The limit range G within which the count N is considered to be valid may be determined, for example based on the maximum deviations of the local oscillator 7. Assuming a data rate of 2400 bits per second, the following values apply for the local oscillator frequency:

$TV_{max}$=440,000/2400∈183, $TV_{rated}$=400,000/2400∈167, and $TV_{min}$=360,000/2400∈150.

In this connection it is necessary to prevent an overrun of the counter 5 so that a possibly false count following an overrun cannot be interpreted as being a valid count.

Figure 2:
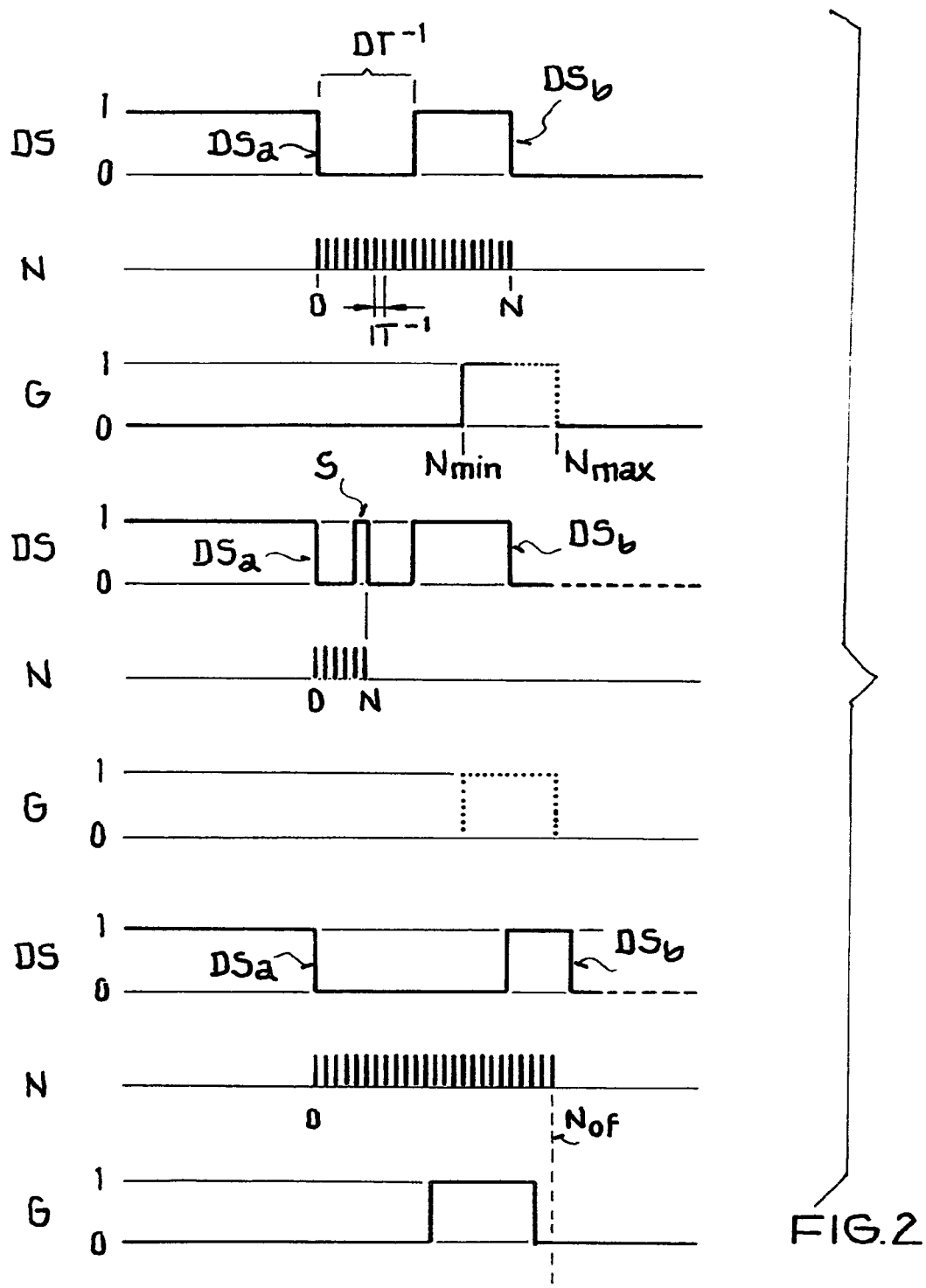
FIG. 2 shows basic wave forms or impulses regarding the validity range of a ratio adaptation or updating according to the invention including avoiding a counter overflow when performing the present method.

FIG. 2 illustrates graphically the above described features of the invention. The signal or rather data signal DS is received, for example, through a bus not shown but connected to the input 2. The count N is available at the output of the counter 5. The vertical lines symbolize counting events which are spaced from one another by a time spacing $IT^{-1}$. The letter G defines the validity range for the count values N between a minimal value $N_{min}$ and a maximum value $N_{max}$. This validity range G represents a logic window, so to speak, whereby the level "0" signifies "not valid" and the level "1" signifies "valid": $N_{min/max}$=2$TV_{min/max}$.

In the upper part of FIG. 2, the count N is valid between two falling flanks DSa and DSb of the data signal DS. This count N is used for adapting or updating the division ratio or initially given pulse count TV to obtain TV'. In the middle portion of FIG. 2 the count N is considered to be invalid due to a disturbance S on the data bus. In the lower part of FIG. 2, the counts are also invalid because of an overflow $N_{OF}$ at the output of the counter 5. Such invalid counts must be excluded by the computer 8 shown in FIG. 1.

Figure 3:
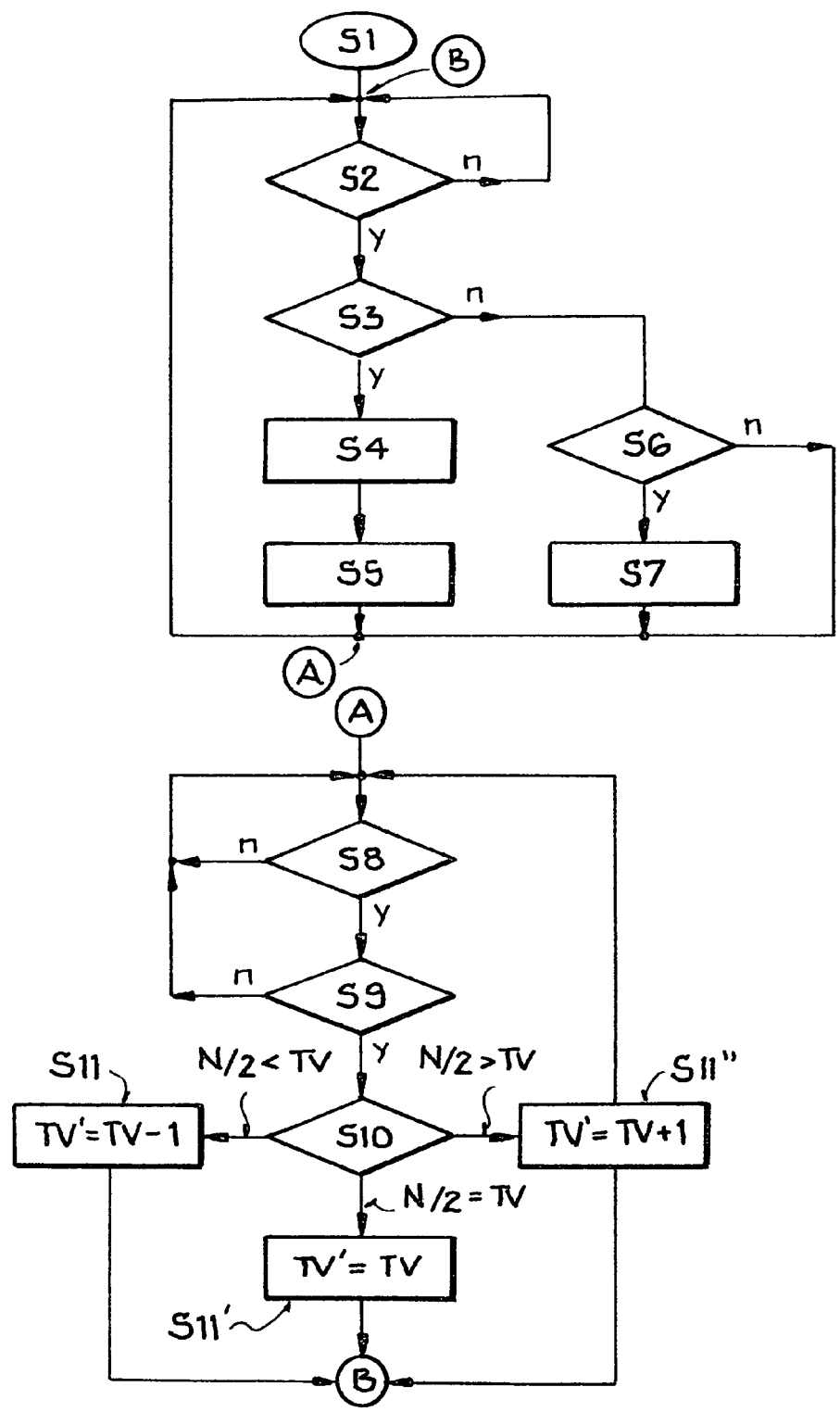
FIG. 3 shows a flow diagram illustrating the performance of the present method.

FIG. 3 shows a flow diagram illustrating the performance of the present method. A starting step S1 is followed by a cyclical interrogation step S2 to see whether a clock signal of the local oscillator 7 has been received by the counter 5. As soon as this is the case as indicated by the letter y, step S3 is performed to see whether a data signal on the bus or at the input 2 has a falling flank. If this is the case as again indicated by the letter y, the step S4 is performed by temporarily storing the count N in the memory 6. In the next step S5 the counter 5 is set to 0 again. Thereafter, the present method is performed by continuing with step S2 and so forth.

If the interrogation in step S3 is negated at n, step S6 is performed for a further interrogation to see whether the count N is smaller than the overflow count $N_{OF}$ thus: N<$N_{OF}$.

If this is the case as indicated by the letter y, the count N is incremented by the value 1 in step S7. Thereafter, the method is continued with step S2 as indicated at B. In case the interrogation in step S6 is negated at n, no incrementation is performed and the operation is continued with step S2.

When step S5 is properly completed, the operation is continued at A with step S8 in the computer 8 for adapting or updating the ratio or initial pulse count TV, whereby first step S8 involves a further cyclical interrogation whether a local oscillator 7 signal has been received. If this receipt is confirmed as positive y, step S9 is performed, whereby further interrogations are made to see whether the count temporarily stored in the memory 6 is within the valid or permissible range G, more specifically to see whether $N_{min}$ is smaller than or equal to N, which in turn is smaller than or equal to $N_{max}$: thus $N_{min} \leq N \leq N_{max}$. A check is made to see whether the respective value has not yet been taken into account.

In case the response to all interrogations is positive y, step S10 compares the count value N with the present actual ratio TV temporarily stored in the memory 6. Depending on the result of the comparison N/2<TV, or N/2=TV, or N/2>TV any one of the steps S11, S11' or S11" is performed for adapting or updating the division ratio TV'=TV−1 or TV'=TV or TV'=TV+1 respectively. Thereafter, the above described sequence of steps is repeated automatically starting at point "B" in FIG. 3.

Thus, the adapted or updated division ratio TV' is taken over always at the end of a data bit or at the beginning of a new bit. Care must be taken that the division ratio does not change in the center of a bit. Otherwise a double interrogation is possible, namely at the preceding ratio TV and at the updated ratio TV'.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of operating a function unit to obtain data from a data pulse signal, said method comprising the steps:
   a) receiving, into said function unit, said data pulse signal (DS) including data pulses at a first clock frequency;
   b) generating, in said function unit, a local oscillator signal having clock pulses at a second clock frequency;
   c) providing a first pulse count ratio;
   d) interrogating at least one of said data pulses respectively at an interrogation time determined from a number of said clock pulses dependent on said first pulse count ratio;
   e) counting said clock pulses of said local oscillator signal occurring in time between two predetermined pulse flanks of said data pulses of said data pulse signal to provide an actual pulse count (N);
   f) dividing said actual pulse count (N) by 2 to provide a second pulse count ratio;
   g) comparing said first pulse count ratio with said second pulse count ratio to provide a comparison result; and
   h) updating a present value of said first pulse count ratio to an updated value of said first pulse count ratio in response to and dependent on said comparison result.

2. The method of claim 1, wherein, in said step d), said interrogation time is determined from said number of said clock pulses corresponding to one-half of said first pulse count ratio.

3. The method of claim 1, wherein said updating in said step h) comprises increasing said present value of said first pulse count ratio by a fixed increment to produce said updated value if said second pulse count ratio is greater than said present value of said first pulse count ratio, and decreasing said present value of said first pulse count ratio by a fixed decrement to produce said updated value if said second pulse count ratio is less than said present value of said first pulse count ratio.

4. The method of claim 1, wherein said step of updating said present value of said first pulse count ratio is performed in accordance with the following rules:

$TV'=TV+1$, for $N/2>TV$;

$TV'=TV-1$, for $N/2<TV$;

$TV'=TV$, for $N/2=TV$;

wherein:
TV is said present value of said first pulse count ratio,
TV' is said updated value of said first pulse count ratio,
N is said actual pulse count, and
N/2 is said second pulse count ratio.

5. The method of claim 1, wherein said two predetermined pulse flanks of said received data pulse signal (DS) between which said counting step is performed, are two respective falling pulse flanks.

6. The method of claim 1, wherein said two predetermined pulse flanks of said received data pulse signal (DS) between which said counting step is performed, are two respective rising pulse flanks.

7. The method of claim 1, further comprising resetting said actual pulse count (N) in response to reaching a second pulse flank of said two predetermined pulse flanks of said data pulse signal, and storing said updated value of said first pulse count ratio in a memory to provide said updated value as said present value of said first pulse count ratio in a next iteration of said steps d), e), f), g) and h).

8. The method of claim 1, further comprising establishing a validity range (G) for said actual pulse count (N), monitoring whether said actual pulse count (N) is within said validity range (G), generating a control signal in response to whether said actual pulse count (N) is outside or inside said validity range, and performing or preventing said updating step in response to said control signal.

9. The method of claim 1, comprising performing said steps d), e), f), g) and h) repeatedly during a duration of said receiving of said data pulse signal (DS).

10. The method of claim 1, comprising performing said steps a), b), c), d), e), f), g) and h) continuously during a duration of said receiving of said data pulse signal.

11. A circuit arrangement for operating a function unit adapted to receive a data pulse signal (DS) including data pulses at a first clock frequency (DT), said circuit arrangement comprising a counter (5) having a first input (2) for receiving said data pulse signal (DS) and a second input (2'), a memory for storing a first pulse count ratio, a local oscillator (7) operatively connected to said second input (2') for supplying to said second input (2') of said counter (5) said local oscillator signal having clock pulses at a second clock frequency (IT), wherein said counter (5) is adapted to count said clock pulses of said local oscillator signal between two predetermined flanks (DSa, DSb) of said data pulses of said data pulse signal (DS) to provide an actual pulse count (N), a pulse count dividing circuit (9) for dividing said actual pulse count by two to provide a second pulse count ratio (N/2), a comparator (8a) for comparing said first pulse count ratio with said second pulse count ratio to provide a comparison result, and an updating unit (8b) for updating a present value of said first pulse count ratio to an updated value of said first pulse count ratio in response to and dependent on said comparison result.

12. The circuit arrangement of claim 11, wherein said updating unit (8b) is adapted to perform said updating in accordance with the following rules:

$TV'=TV+1$, for $N/2>TV$;

$TV'=TV-1$, for $N/2<TV$;

$TV'=TV$, for $N/2=TV$;

wherein:
TV is said present value of said first pulse count ratio,
TV' is said updated value of said first pulse count ratio,
N is said actual pulse count, and
N/2 is said second pulse count ratio.

13. The circuit arrangement of claim 11, wherein said counter (5) is adapted to count said clock pulses of said local oscillator signal between said two predetermined flanks being a pair of rising pulse flanks of said data pulse signal (DS) or a pair of falling pulse flanks of said data pulse signal (DS).

14. The circuit arrangement of claim 11, comprising a computer (8) including said comparator (8a) and said updating unit (8b), wherein said comparator is adapted for providing a control signal to said updating unit to prevent an updating of said present value of said first pulse count ratio when said control signal signifies that said second pulse count ratio is outside a valid count range (G).

15. The circuit arrangement of claim 14, wherein said comparator (8a) comprises a first threshold circuit for eliminating said second pulse count ratio that is smaller than a first threshold, and a second threshold circuit for eliminating said second pulse count ratio that is larger than a second threshold.

16. A method of reading data from a data signal received by a function unit, comprising the steps:
   a) receiving, into said function unit, a data signal comprising data pulses bounded by rising and falling pulse flanks;
   b) generating, in said function unit, a local oscillator signal comprising a succession of oscillator clock pulses;
   c) providing a nominal value (TV) of a pulse division ratio;
   d) interrogating said data signal to read therefrom at least a respective one of said data pulses respectively at an interrogation time upon elapsing of a determined number of said oscillator clock pulses as determined from and dependent on said nominal value of said pulse division ratio;
   e) counting a present actual number (N) of said oscillator clock pulses of said local oscillator signal that occur between two of said rising pulse flanks or two of said falling pulse flanks of said data signal;
   f) dividing said present actual number (N) of said oscillator clock pulses by two to produce a present actual value (N/2) of a pulse division ratio;
   g) comparing said present actual value (N/2) of said pulse division ratio with said nominal value (TV) of said pulse division ratio to provide a comparison result;
   h) dependent on and responsive to said comparison result, if said present actual value (N/2) is greater than said nominal value (TV) then increasing said nominal value by a predetermined fixed increment, or if said present actual value (N/2) is less than said nominal value (TV) then decreasing said nominal value by a predetermined fixed decrement; and
   i) continuing said receiving of said step a) and said generating of said step b), and repeating said steps d), e), f), g) and h) in plural repetition cycles.

17. The method according to claim 16, wherein, in said step d), said determined number of said oscillator clock pulses is determined as one-half of said nominal value of said pulse division ratio.

18. The method according to claim 16, wherein, in said step h), said predetermined fixed increment is +1 and said predetermined fixed decrement is −1.

19. The method according to claim 16, further comprising, in said step h), leaving said nominal value unchanged if said present actual value is equal to said nominal value.

20. The method according to claim 16, wherein said step a) comprises receiving said data signal via a single wire bus by a unidirectional transmission from a transmitter, said functional unit does not receive any distinct synchronization field from said transmitter, and said functional unit does not communicate back to said transmitter.

21. The method according to claim 16, further comprising checking whether said present actual value of said pulse division ratio is within a predetermined valid range before said step h), and performing said step h) only if said present actual value of said pulse division ratio is within said predetermined valid range.

* * * * *